(12) United States Patent
Smith et al.

(10) Patent No.: US 9,616,580 B2
(45) Date of Patent: Apr. 11, 2017

(54) END EFFECTOR FOR A ROBOTIC ARM

(71) Applicant: Sarcos LC, Salt Lake City, UT (US)

(72) Inventors: Fraser M. Smith, Waltham, MA (US); Michael Morrison, Waltham, MA (US); Glenn Colvin, Jr., Waltham, MA (US); Wayco Scroggin, Waltham, MA (US)

(73) Assignee: Sarcos LC, Salt Lake City, UT (US)

( * ) Notice: Subject to any disclaimer, the term of this patent is extended or adjusted under 35 U.S.C. 154(b) by 481 days.

(21) Appl. No.: 13/841,006

(22) Filed: Mar. 15, 2013

(65) Prior Publication Data

US 2013/0302129 A1 Nov. 14, 2013

Related U.S. Application Data

(60) Provisional application No. 61/646,743, filed on May 14, 2012.

(51) Int. Cl.
| | |
|---|---|
| *B25J 15/10* | (2006.01) |
| *B25J 15/00* | (2006.01) |
| *B25J 13/08* | (2006.01) |
| *B25J 15/04* | (2006.01) |

(52) U.S. Cl.
CPC ......... *B25J 15/0066* (2013.01); *B25J 13/086* (2013.01); *B25J 15/0475* (2013.01); *B25J 15/10* (2013.01); *Y10S 901/30* (2013.01)

(58) Field of Classification Search
CPC ... B25J 3/04; B25J 9/0084; B25J 9/009; B25J 9/10; B25J 15/00; B25J 15/0009; B25J 15/0028; B25J 15/0033; B25J 15/0042; B25J 15/0066; B25J 15/02; B25J 15/0206; B25J 15/08; B25J 15/10; G05B 2219/37117; G05B 2219/37281; G05B 2219/37304; G05B 2219/37558; G05B 2219/37571; Y10S 901/39
USPC ....... 414/680, 729, 730, 732, 736, 738, 739, 414/753.1; 700/259; 901/9, 31, 39, 47
See application file for complete search history.

(56) References Cited

U.S. PATENT DOCUMENTS

| | | | |
|---|---|---|---|
| 1,880,138 | A | 9/1932 | Franz |
| 3,280,991 | A | 10/1966 | Melton et al. |
| 4,046,262 | A | 9/1977 | Vykukal et al. |
| 4,179,233 | A | 12/1979 | Bromell et al. |

(Continued)

FOREIGN PATENT DOCUMENTS

| | | | |
|---|---|---|---|
| EP | 0616275 | 9/1998 | |
| EP | 1037264 A2 * | 9/2000 | .......... B25J 15/0206 |

(Continued)

OTHER PUBLICATIONS

U.S. Appl. No. 14/606,962, filed Jan. 27, 2015; Stephen C. Jacobsen; office action dated Apr. 14, 2015.

(Continued)

*Primary Examiner* — Michael McCullough
*Assistant Examiner* — Brendan Tighe (57) ABSTRACT

An end effector for a robotic arm is disclosed. The end effector includes a grasping apparatus having a gripping member and an appendage extending from the gripping member forming a channel between the griping member and the appendage. The channel is configured to receive at least a portion of an article, such as a latch for a container, to be manipulated by the end effector.

14 Claims, 5 Drawing Sheets

(56) References Cited

U.S. PATENT DOCUMENTS

| | | |
|---|---|---|
| 4,251,791 A | 2/1981 | Yanagisawa |
| 4,483,407 A | 11/1984 | Iwamoto et al. |
| 4,567,417 A | 1/1986 | Francois et al. |
| 4,591,944 A | 5/1986 | Gravel |
| 4,661,032 A | 4/1987 | Arai |
| 4,666,357 A | 5/1987 | Babbi |
| 4,762,455 A | 8/1988 | Coughlan et al. |
| 4,768,143 A | 8/1988 | Lane et al. |
| 4,853,874 A | 8/1989 | Iwamoto et al. |
| 4,883,400 A | 11/1989 | Kuban et al. |
| 4,915,437 A | 4/1990 | Cherry |
| 4,921,292 A | 5/1990 | Harwell et al. |
| 4,997,095 A | 3/1991 | Jones et al. |
| 5,004,391 A | 4/1991 | Burdea |
| 5,038,089 A | 8/1991 | Szakaly |
| 5,072,361 A | 12/1991 | Davis et al. |
| 5,101,472 A | 3/1992 | Repperger |
| 5,105,367 A | 4/1992 | Tsuchihashi et al. |
| 5,239,246 A | 8/1993 | Kim |
| 5,282,460 A | 2/1994 | Boldt |
| 5,336,982 A | 8/1994 | Backes |
| 5,399,951 A | 3/1995 | Lavallee et al. |
| 5,664,636 A | 9/1997 | Ikuma et al. |
| 5,784,542 A | 7/1998 | Ohm et al. |
| 5,797,615 A | 8/1998 | Murray |
| 5,845,540 A | 12/1998 | Rosheim |
| 5,949,686 A | 9/1999 | Yoshinada et al. |
| 5,967,580 A | 10/1999 | Rosheim |
| 5,994,864 A | 11/1999 | Inoue et al. |
| 6,016,385 A | 1/2000 | Yee et al. |
| 6,170,162 B1 | 1/2001 | Jacobsen et al. |
| 6,272,924 B1 | 8/2001 | Jansen |
| 6,301,526 B1 | 10/2001 | Kim et al. |
| 6,338,605 B1 | 1/2002 | Halverson et al. |
| 6,340,065 B1 | 1/2002 | Harris |
| 6,360,166 B1 | 3/2002 | Alster |
| 6,394,731 B1 | 5/2002 | Konosu et al. |
| 6,430,473 B1 | 8/2002 | Lee et al. |
| 6,507,163 B1 | 1/2003 | Allen |
| 6,554,342 B1 | 4/2003 | Burnett |
| 6,659,703 B1 | 12/2003 | Kirkley |
| 6,663,154 B2 | 12/2003 | Pancheri |
| 7,168,748 B2 * | 1/2007 | Townsend ............... B25J 9/1612 294/106 |
| 7,396,057 B2 | 7/2008 | Ye et al. |
| 7,405,531 B2 | 7/2008 | Khatib et al. |
| 7,409,882 B2 | 8/2008 | Massimo et al. |
| 7,410,338 B2 | 8/2008 | Schiele et al. |
| 7,783,384 B2 | 8/2010 | Kraft |
| 7,862,524 B2 | 1/2011 | Carignan et al. |
| 7,965,006 B2 | 6/2011 | Kang et al. |
| 8,024,071 B2 | 9/2011 | Komatsu et al. |
| 8,151,401 B2 | 4/2012 | Cheyne |
| 8,295,975 B2 | 10/2012 | Arimatsu et al. |
| 8,452,447 B2 | 5/2013 | Nixon |
| 8,473,101 B2 | 6/2013 | Summer |
| 8,511,192 B2 | 8/2013 | Hirtt |
| 8,529,582 B2 | 9/2013 | Devengenzo et al. |
| 8,560,118 B2 | 10/2013 | Greer et al. |
| 8,667,643 B2 | 3/2014 | Simonelli et al. |
| 2001/0033146 A1 | 10/2001 | Kato |
| 2003/0152452 A1 | 8/2003 | Hodgson |
| 2004/0037681 A1 | 2/2004 | Marcotte |
| 2005/0193451 A1 | 9/2005 | Quistgaard et al. |
| 2005/0251110 A1 | 11/2005 | Nixon |
| 2006/0149419 A1 | 7/2006 | Ogawa et al. |
| 2006/0184275 A1 | 8/2006 | Hosokawa et al. |
| 2006/0245897 A1 | 11/2006 | Hariki et al. |
| 2007/0105070 A1 | 5/2007 | Trawick |
| 2007/0123997 A1 | 5/2007 | Herr et al. |
| 2008/0271942 A1 | 11/2008 | Yamashita et al. |
| 2008/0281468 A1 | 11/2008 | Jacobsen et al. |
| 2009/0038258 A1 | 2/2009 | Pivac et al. |
| 2009/0039579 A1 | 2/2009 | Clifford et al. |
| 2009/0210093 A1 | 8/2009 | Jacobsen et al. |
| 2010/0050947 A1 | 3/2010 | Kortekaas |
| 2010/0089855 A1 | 4/2010 | Kjolseth |
| 2010/0198402 A1 | 8/2010 | Greer et al. |
| 2010/0295497 A1 | 11/2010 | Takamatsu |
| 2011/0010012 A1 | 1/2011 | Murayama et al. |
| 2011/0046781 A1 | 2/2011 | Summer |
| 2011/0071677 A1 | 3/2011 | Stillman |
| 2012/0000891 A1 | 1/2012 | Nakanishi |
| 2012/0060322 A1 | 3/2012 | Simonelli et al. |
| 2012/0065902 A1 | 3/2012 | Nakajima |
| 2012/0237319 A1 | 9/2012 | Jacobsen et al. |
| 2012/0277901 A1 | 11/2012 | Jacobsen et al. |
| 2012/0277911 A1 | 11/2012 | Jacobsen et al. |
| 2012/0277915 A1 | 11/2012 | Jacobsen et al. |
| 2012/0328395 A1 | 12/2012 | Jacobsen et al. |
| 2013/0011220 A1 | 1/2013 | Jacobsen et al. |
| 2013/0013108 A1 | 1/2013 | Jacobsen et al. |

FOREIGN PATENT DOCUMENTS

| | | | |
|---|---|---|---|
| EP | 1258324 | 11/2002 | |
| JP | 52013252 | 2/1977 | |
| JP | S56-140510 | 11/1981 | |
| JP | S60-177883 | 11/1985 | |
| JP | S62-193784 | 8/1987 | |
| JP | 01-295772 | 11/1989 | |
| JP | H01-295772 | 11/1989 | |
| JP | H02-51083 | 4/1990 | |
| JP | H03-85398 | 8/1991 | |
| JP | H04 44296 | 4/1992 | |
| JP | 5004177 | 1/1993 | |
| JP | H07-1366 | 1/1995 | |
| JP | 7060679 | 3/1995 | |
| JP | H07-112377 | 5/1995 | |
| JP | H07-31291 | 6/1995 | |
| JP | H07-246578 | 9/1995 | |
| JP | 9-011176 | 1/1997 | |
| JP | 11130279 | 5/1999 | |
| JP | 2002-161547 | 6/2002 | |
| JP | 2005/334999 | 12/2005 | |
| JP | 2006-16916 | 1/2006 | |
| JP | 2006-28953 | 2/2006 | |
| JP | 3909770 B2 * | 4/2007 | ....... H01L 21/68707 |
| JP | 2008-143449 | 6/2008 | |
| JP | 2009-167673 | 7/2009 | |
| JP | 2010098130 A * | 4/2010 | ............. B25J 15/08 |
| WO | WO 2007/144629 | 12/2007 | |
| WO | WO 2009/143377 | 11/2009 | |

OTHER PUBLICATIONS

U.S. Appl. No. 13/332,165, filed Dec. 20, 2011; Stephen C. Jacobsen; office action dated Apr. 17, 2015.

U.S. Appl. No. 13/332,165, filed Dec. 20, 2011; Stephen C. Jacobsen; office action dated Jan. 7, 2015.

Aliens (Movie), Starring Sigourney Weaver, Directed by James Cameron, Written by James Cameron, David Giler, Walter Hill, Dan O'Bannon, and Ronald Shuset, Released 1985 by Twentieth Century Fox, Scenes at Playtime 88:26:31-00:26:59 & 00:27:40-00:28:05 & 02:08:25-02:10:39 Non-Patent Literature Documentation; Aliens(1986)—IMDb; downloaded Sep. 27, 2014; 4 pages; http://www.imdb.com/title/tt10090605/.

U.S. Appl. No. 13/421,612, filed Mar. 15, 2012; Stephen C. Jacobsen; office action dated Oct. 7, 2014.

U.S. Appl. No. 13/332,138, filed Dec. 20, 2011; Stephen C. Jacobsen; Notice of Allowance mailed Oct. 10, 2014.

U.S. Appl. No. 13/332,129, filed Dec. 20, 2011; Stephen C. Jacobsen; Notice of Allowance mailed Oct. 24, 2014.

U.S. Appl. No. 13/332,146, filed Dec. 20, 2011; Stephen C. Jacobsen; office action dated Nov. 17, 2014.

U.S. Appl. No. 13/332,146, filed Dec. 20, 2011; Stephen C. Jacobsen; office action dated Jul. 24, 2014.

U.S. Appl. No. 13/332152; filed Dec. 20, 2011; Stephen C. Jacobsen; notice of allowance mailed Aug. 20, 2014.

U.S. Appl. No. 13/332,129, filed Dec. 20, 2011; Stephen C. Jacobsen; office action dated Jun. 17, 2014.

(56) References Cited

OTHER PUBLICATIONS

U.S. Appl. No. 13/332,160, filed Dec. 20, 2011; Stephen C. Jacobsen; notice of allowance mailed Jul. 8, 2014.
U.S. Appl. No. 13/421,612, filed Mar. 15, 2012; Stephen C. Jacobsen; office action dated Mar. 12, 2015.
PCT/US2012/035511; filed Apr. 27, 2012; Raytheon Company; International Search report dated Mar. 4, 2013.
U.S. Appl. No. 13/332,138, filed Dec. 20, 2011; Stephen C. Jacobsen; office action dated Mar. 10, 2014.
U.S. Appl. No. 13/332,160, filed Dec. 20, 2011; Stephen C. Jacobsen; office action dated Mar. 12, 2014.
U.S. Appl. No. 13/332,152, filed Dec. 20, 2011; Stephen C. Jacobsen; office action dated Mar. 28, 2014.
U.S. Appl. No. 13/332,129, filed Dec. 20, 2011; Stephen C. Jacobsen.
U.S. Appl. No. 13/332,152, filed Dec. 20, 2011; Stephen C. Jacobsen.
Barras; "Stabilization of a Biped Robot with its arms—A Practical Approach"; May 1, 2010; http://biorob.epfl.ch/files/content/sites/biorob/filed/users/170220/public/Report.pdf; retrieved on Jul. 10, 2013.
Bauman; Utah Firm Markets on Big Gorilla of an Arm; Deseret News; Jan. 27, 1993; 2 pages.
Heavy-Duty Magnetic Base, 300 lb (1334 N) Holding Force, ¼-20Thread; Newport; http://search.newport.com/?q=*&x2=sku&q2=200; as accessed Apr. 23, 2011; 1 page.
Jacobsen et al; Research Robots for Applications in Artificial Intelligence, Teleoperation and Entertainment; The International Journal of Robotics Research; Apr.-May 2004; pp. 319-330; vol. 23, No. 4-5.
Jacobsen; Science, Robotics, and Superheroes; Presented at University of Utah's Science at Breakfast, Mar. 17, 2010; 16 pages.
Kim et al; A Force Reflected Exoskeleton-Type Masterarm for Human-Robot Interaction; IEEE Transactions on Systems, Man and Cybertentics—Part A: Systems and Humans; Mar. 2005; pp. 198-212; vol. 35, No. 2.
Manipulator Dynamics; Amikabir University of Technology; Computer Engineering and Information Technology Department; Power Point; 44 pages.
Moosavian, et al.; "Dynamics Modeling and Tip-Over Stability of Suspended Wheeled Mobile Robots with Multiple Arms"; Oct. 29, 2007; IEEE; pp. 1210-1215.
Schuler et al; Dextrous Robot Arm; In Proceedings of the 8$^{th}$ ESA Workshop on Advanced Space Technologies for Robotic and Automation; ASTRA 2004 ESTEC, Noordwijk, The Netherlands, Nov. 2-4, 2004; 8 pages.
Song et al; Kinematics Analysis and Implementation of a Motion-Following Task for a Humanoid Slave Robot Controlled by an Exoskeleton Master Robot; International Journal of Control, Automation and Systems; Dec. 2007; pp. 681-690; vol. 5, No. 6.
Tmsuk, Rescue Robot "T-53" release Control Technologies to Control the Synchronous Operation of the Arm; http://robot.watch.impress.co.jp/eda/news/2007/07/18/564.html; as accessed Sep. 1, 2011; 5 pages.
Yeates; Utah-Built Robot Safeguards the Workplace; http://www.ksl.com?nid=148&sid=17654421&autostart=y; Oct. 13, 2011; 3 pages.
Giant Robot Grabbing Hands Grab All They Can; Jul. 17, 2007; 3 pages ; www.digitalworldtokyo.com/index.php/digital_tokyo/articles/giant_robot_grabbing_hands_grab_all_they_can/.
Industrial Magnetics, Inc.—PowerLift® Magnets; 2 pages; as accessed Nov. 6, 2012.
Magnetic Base; www.ask.com/wiki/magnetic_base; 2 pages; page last updated Sep. 12, 2012.
PCT/US2012/035609; filed Apr. 27, 2012; Raytheon Company; search report dated Jul. 29, 2013.
PCT/US2012/035620; filed Apr. 27, 2012; Raytheon Company; search report dated Jul. 7, 2013.
PCT/US2012/035592; filed Apr. 27, 2012; Raytheon Company; search report dated Feb. 8, 2013.
U.S. Appl. No. 13/332,129, filed Dec. 20, 2011; Stephen C. Jacobsen; office action issued Dec. 23, 2013.
U.S. Appl. No. 13/332,129, filed Dec. 20, 2011; Stephen C. Jacobsen; office action dated Dec. 23, 2013.
PCT/US2012/035553; filed Apr. 27, 2012 Apr. 27, 2012; Raytheon; International Search report dated Oct. 31, 2012.
PCT/US2012/035570; filed Apr. 27, 2012; Raytheon Company; International Search Report dated Feb. 8, 2013.
PCT/US2012/035592; filed Apr. 27, 2012; Raytheon Company; search report dated Aug. 2, 2013.
U.S. Appl. No. 13/332,138, filed Dec. 20, 2011; Stephen C. Jacobsen.
U.S. Appl. No. 13/332,146, filed Dec. 20, 2011; Stephen C. Jacobsen.
U.S. Appl. No. 13/332,160, filed Dec. 20, 2011; Stephen C. Jacobsen.
U.S. Appl. No. 13/421,612, filed Mar. 15, 2012; Stephen C. Jacobsen.
U.S. Appl. No. 13/332,165, filed Dec. 20, 2011; Stephen C. Jacobsen.
Office Action for U.S. Appl. No. 14/543,733 dated Jan. 25, 2016, 23 pages.
Office Action for U.S. Appl. No. 13/332,146 dated Sep. 4, 2015, 25 pages.
Office Action for U.S. Appl. No. 13/332,165 dated Oct. 2, 2015, 11 pages.
Office Action for U.S. Appl. No. 13/421,612 dated Jul. 30, 2015, 33 pages.
Office Action for U.S. Appl. No. 14/606,962 dated Sep. 4, 2015, 24 pages.
Notice of Allowance for U.S. Appl. No. 13/421,612, dated Sep. 18, 2015, 10 pages.

* cited by examiner

END EFFECTOR FOR A ROBOTIC ARM

CROSS-REFERENCE TO RELATED APPLICATIONS

This application claims the benefit of U.S. Provisional Application No. 61/646,743, filed May 14, 2012, and entitled, "End Effector for a Robotic Arm," which is incorporated by reference in its entirety herein.

GOVERNMENT LICENSE RIGHTS

This invention was made with government support under H94003-04-D-0006 awarded by the Defense Microelectronics Activity (DMEA). The government has certain rights in the invention.

BACKGROUND

Robots can be used to great advantage when automating certain tasks. One area for potential automation is inspecting storage containers. This can reduce the risk to people from potentially hazardous container contents. Most man-handleable storage containers are constructed from stamped sheet metal with latches that have been designed to make them relatively easy for people to open. However, current robotic designs do not exist that make it possible for a robot to be able to easily open such storage containers. Typical two-jaw parallel grippers found on many robots that are equipped with end effectors have not been able to accomplish the container-opening related tasks. As such, in order to be able to facilitate the ability of robotic end effectors to be able to handle, open, inspect and close various containers, either the containers themselves would need to be redesigned to be workable with current end effector designs, or the end effectors themselves would need to be redesigned and configured to achieve such purposes. Redesigning and implementing changes to containers to be workable with current robotic end effector designs would likely result in significant costs.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

An initial overview of technology embodiments is provided below and then specific exemplary technology embodiments are described in further detail later. This is intended to aid readers in understanding the technology more quickly but is not intended to identify key features or essential features of the technology nor is it intended to limit the scope of the claimed subject matter.

Although typical end effectors having parallel two-jaw grippers can be useful for many applications, such end effectors have proven inadequate to accomplish container-opening and closing related tasks (which may include latching and unlatching tasks), which therefore renders automation of storage container opening and inspection impossible or, at least, prohibitively expensive. Accordingly, an end effector for a robotic arm is disclosed that allows manipulation of a latch for a storage container or similar article. The end effector includes a grasping apparatus having a gripping member and an appendage extending from the gripping member forming a channel between the griping member and the appendage. The channel is configured to receive at least a portion of an article, such as a latch for a storage container, to be manipulated by the end effector.

Figure 1:
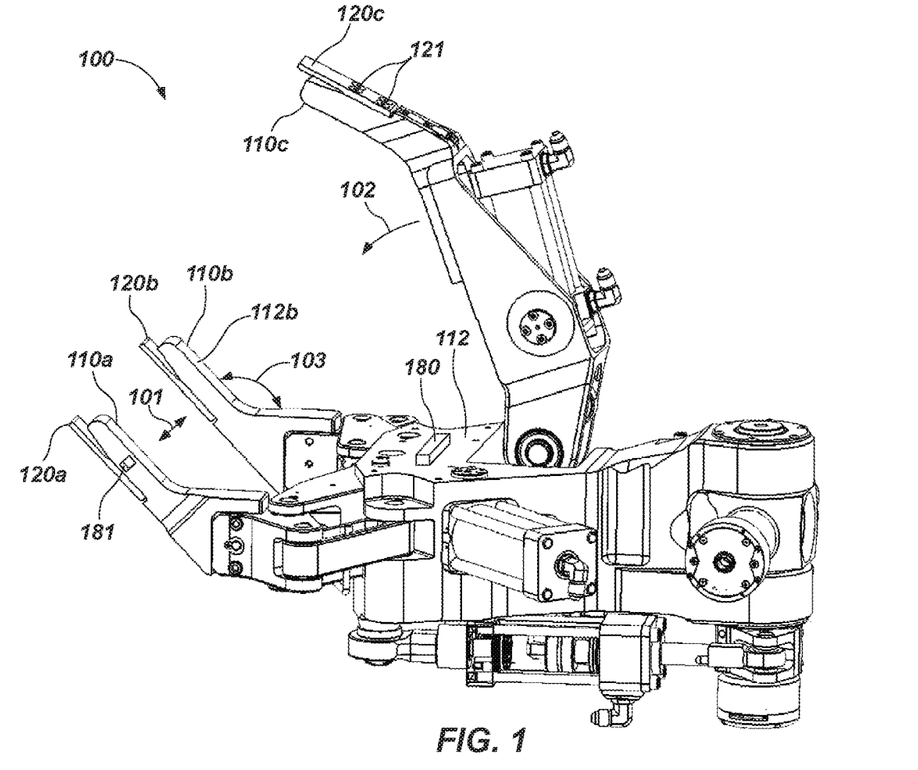
FIG. 1 is an example illustration of an end effector for a robotic arm in accordance with an embodiment of the present invention.

One embodiment of an end effector 100 for a robotic arm is illustrated in FIG. 1. The end effector 100 can comprise a grasping apparatus having one or more gripping members, such as first and second finger-type gripping members 110a, 110b and a third opposable thumb-type gripping member 110c. One such robotic grasping apparatus is disclosed in U.S. Pat. No. 5,588,688, which is incorporated by reference herein in its entirety. The finger-type gripping members fingers 110a, 110b of the grasping apparatus can be configured to move in direction 101 relative to one another. The thumb-type gripping member 110c can be configured to move in direction 102 to grasp an object. The finger-type and/or thumb-type gripping members can be oriented at an angle 103 to enhance grasping capabilities. In one aspect, the finger-type and/or thumb-type gripping members can be configured such that the angle 103 is adjustable, such as by a rotatable joint.

The end effector 100 can also include one or more appendages, such as appendages 120a, 120b, 120c, extending from one or more of the gripping members. As described in more detail hereinafter, the appendage operate with the gripping member to form a channel or void between the griping member and the appendage, such that the channel comprises walls that interface with an article to be manipulated by the end effector. The channel can be configured to receive at least a portion of an article to be manipulated by the end effector, such as a latch of a storage container. In many containers comprising latches, the latch is typically accessible from one side. The appendage can be positioned on a side or about a surface of the gripping member (e.g., finger and/or thumb-type gripping members) opposite a grasping surface (e.g., see grasping surface 112b of gripping member 110b), similar to a fingernail of a human. Thus, the gripping members of the grasping apparatus can maintain full functionality for grasping objects and, by incorporating an appendage, can also be utilized to manipulate objects that otherwise would have been beyond the capabilities of the end effector. This placement can also provide access to a container latch and, once engaged with the latch, leverage to assist in successfully opening and/or closing the latch. The formation of the channel by the appendage and the gripping member can therefore effectively capture the stamped plate latches present on many storage containers.

In one aspect, an appendage can be an integral or permanent component with a gripping member. In another aspect, as shown in the figure, an appendage can be removably attachable to a gripping member. For example, appendage 120c can be removably coupled to the thumb 110c with fasteners 121. This can provide for interchangeability of the appendage, such as to repair or replace an appendage, to install an appendage of a different configuration, to modify a dimension of the appendage or the formed channel or other attribute or feature, etc. as described herein.

The appendage can comprise a plurality of configurations. For example, in one exemplary embodiment, an appendage can comprise a long, thin structure, and can be made of any suitable material, such as metal, metal alloys, composite materials, plastics, etc. A variety of configurations are contemplated, provided these operate with the gripping member in a suitable manner to provide the functionality discussed herein. Moreover, an appendage can be coupled or associated with any one or more of the gripping members, and a gripping member need not have an appendage.

Figure 2A:
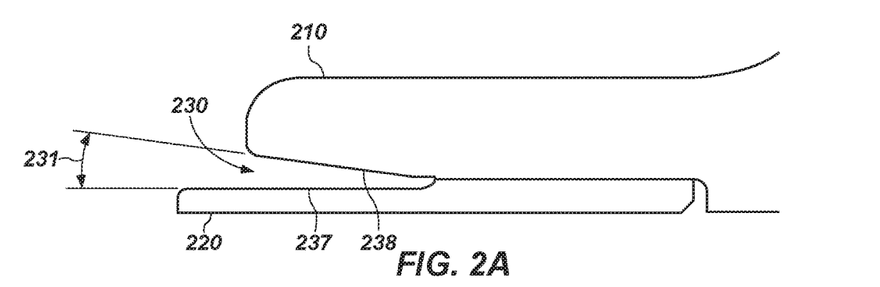
FIG. 2A is an example illustration of a gripping member and an appendage in accordance with an embodiment of the present invention.
Figure 2B:
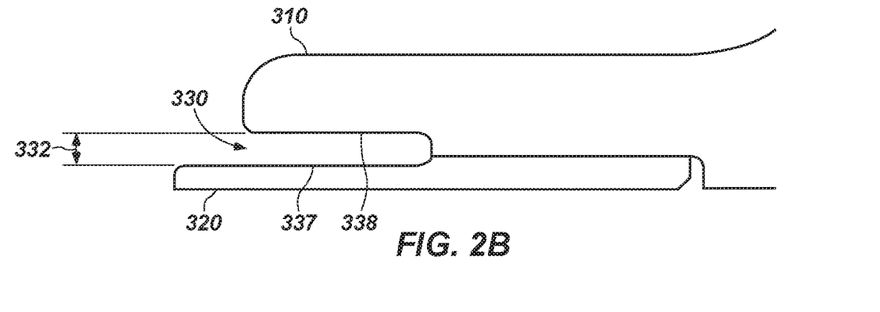
FIG. 2B is an example illustration of a gripping member and an appendage in accordance with another embodiment of the present invention.

FIGS. 2A and 2B illustrate different embodiments of channels that can be formed by an appendage and a gripping member. For example, as shown in FIG. 2A, a tapered channel 230 can have walls 237, 238 tapered at an angle 231 to facilitate capturing a latch and to wedge the latch positively into the space provided. Once captured, the end effector has excellent leverage to move the latch to open and/or close the latch. On the other hand, as shown in FIG. 2B, a gap 332 of a channel 330 formed by parallel walls 337, 338 can be uniform along a length of the channel. In any configuration, the channel can be formed and configured to facilitate capture and operation of the latch, a family of similar latches, or a variety of different types of latches.

Figure 3A:
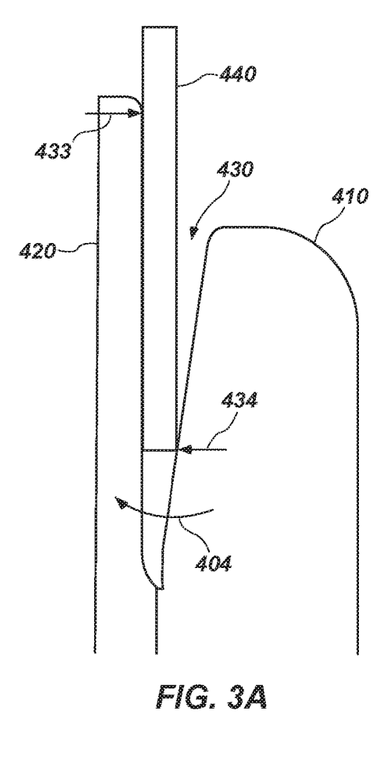
FIGS. 3A and 3B are example illustrations of a channel receiving at least a portion of an article to be manipulated by the end effector, in accordance with an embodiment of the present invention.
Figure 3B:
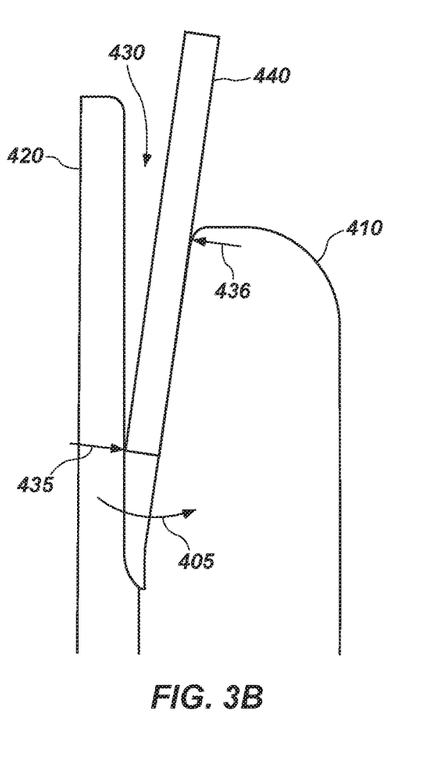

FIGS. 3A and 3B illustrate an article 440, such as a container latch, in a channel 430 formed by an appendage 420 and a gripping member 410 of an end effector. In FIG. 3A, the end effector causes rotation of the appendage and gripping member in direction 404 such that the gripping member impinges on the article 440 exerting force 434 on the article and appendage 420 impinges on the article exerting force 433 on the article. The forces 433, 434 tend to bind the article in the channel and allow the captured article to be manipulated by the end effector. FIG. 3B illustrates rotation of the end effector in an opposite direction 405. Here, the end effector causes rotation of the appendage and gripping member such that the gripping member impinges on the article 440 exerting force 436 on the article and appendage 420 impinges on the article exerting force 435 on the article.

Figure 3C:
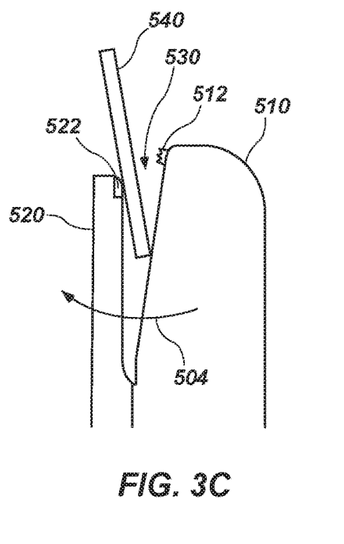
FIG. 3C is an example illustration of a channel receiving at least a portion of an article to be manipulated by the end effector, in accordance with another embodiment of the present invention.

With reference to FIG. 3C, illustrated is another embodiment of a grasping apparatus as part of an end effector, wherein the grasping apparatus is configured to manipulate an article 540 in a channel 530 formed by an appendage 520 and a gripping member 510 of the grasping apparatus of an end effector. In this case, the article 540 is not engaged in the channel to the maximum extent possible. However, as shown in the figure, successful manipulation of the article is still possible. As the end effector is rotated in direction 504, the gripping member and the appendage both impinge on the article sufficient to allow the article to be manipulated by the end effector. This figure illustrates that some of the exemplary appendages and gripping members are contemplated herein as having a suitable configuration (e.g., length dimension) in order to provide a channel with sufficient size, configuration, dimensions to receive an article at various locations within the channel, while still being able to effectively manipulate the article.

Additionally, the appendage and/or gripping member, and the channel formed or defined by these, can include one or more friction enhancing features 522, 512 to improve grip on the article when the article is disposed in the channel. Friction enhancing features can include surface treatments, geometrical features, materials, attachments, etc. configured to enhance friction between the grasping apparatus and the article.

In one aspect of the present disclosure, an appendage can be any suitable length to allow manipulation of the article. For example, as shown in FIGS. 3A and 3B, the appendage 420 can extend a distance beyond the gripping member 410, or beyond the end of the gripping member (again, similar to a fingernail). On the other hand, and in other embodiments, the appendage may not extend beyond the end of the gripping member. For example, the exemplary appendage illustrated in FIG. 3C does not extend beyond the gripping member. Depending on the specific situation, either configuration may prove to be more beneficial in engaging an article.

Figure 4:
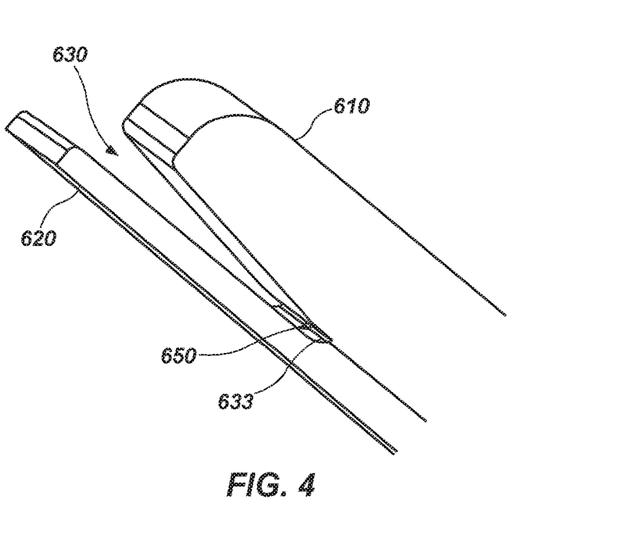
FIG. 4 is an example illustration of a sensor associated with an appendage in accordance with an embodiment of the present invention.

Referring to FIG. 4, a channel 630 is illustrated with a sensor or light 650 disposed therein. In particular, the channel 630 is formed or defined by an appendage 620 and a gripping member 610. The sensor or light 650 associated with the appendage can be located at a base or bottom 633 of the channel 630, as shown, or can be located at other suitable locations about the appendage 620 and/or gripping member 610, or can be present in plurality, if desired. The sensor and/or light 650 can provide various functions, such as to assist positioning of the channel when receiving the article to be manipulated. In other words, the sensor or light can facilitate alignment and engagement of the channel 630 with an article. Any suitable type of sensor is contemplated for use in accordance with the present disclosure. For example, and not to be limiting in any way, a proximity sensor, a laser rangefinder, radar, LIDAR, a positional sensor, a sonar array, a camera, a microphone, or any other type of sensing instruments, alone or in combination, may be used. Additionally, any type of light may be used, including LEDs, those of different emission spectra, including LASERs, and others. Of course, these are not intended to be limiting in any way as other types of sensors, lights, and equipment may be utilized as known in the art.

The sensor or light 650 can be recessed or disposed in countersunk holes at the bottom of the channel. Recessing the sensor or light can provide protection for the sensor or light from the article in the channel.

In some embodiments, both a light and a sensor can be used together. For example, a light can be used to illuminate the article and a camera can be used to provide a visual of the article. Such a camera can be optimized for the spectra emitted by the light. Information received from the sensor can be used to align and engage the channel with the article. In another example, a LIDAR scanner can enable the end effector to carry out 3-D scans of objects and surroundings to facilitate object recognition and positioning of a given object within a workspace.

Sensor information can be communicated to the operator and/or the robotic device. For example, in one aspect, an operator can use the sensor information to manually guide and maneuver the end effector into engagement with the article. In another aspect, the sensor information can be communicated and processed by the robot in a manner so as to facilitate autonomous maneuver of the end effector into engagement with the article.

In some embodiments of the present disclosure, a sensor and/or light can be associated with or disposed on other components or elements of an end effector. For example, as shown in FIG. 1, a sensor or light 180, 181 can be disposed on a gripping member (finger 110*a*) and/or a palm 112 of the grasping apparatus. Thus, a finger, thumb, and/or palm of the grasping apparatus can be equipped with camera and illumination assets to further increase the situational awareness provided by the end effector in the workspace. In some embodiments, a finger, thumb, and/or palm of the grasping apparatus can be equipped with assets or equipment, such as barcode or other code readers, and/or RFID tag readers, any of which can be used to interrogate and properly identify the container and associated contents of record. Additionally, other sensors can be associated with a finger, thumb, and/or palm of the grasping apparatus to permit other types of interrogation, such as NDI assets, acoustic detectors, gas detectors, substance-of-interest detectors, vibration sensors, tactile sensors, spectrometers, biohazard detectors, object recognition capabilities, etc.

It is further contemplated that such sensors and equipment can be disposed at any suitable location on the end effector, not just on the grasping apparatus. In the case of an optical reader, for example, the optical reader can be located at any suitable location, such as to provide an unobstructed view of an object to be scanned. The end effector can include any suitable attachment point or feature or interface, such as a pocket, platform, or counter bore, to accommodate and support a sensor, asset, and/or other equipment disposed on the end effector. Those skilled in the art will recognize the many different types of sensors that can be utilized, as well as the several locations that these can be placed about the end effector. Sensors, assets, and/or other equipment can therefore be utilized to open/close a container and/or to inspect the contents of a container once opened.

In a particular aspect of the present disclosure, applicable to facilitating use of the end effector by a human operator in real-time and/or enabling automation of the end effector (such as a container access and inspection process), the sensors, assets, and/or equipment described above can be used to augment situational awareness. For example, a LIDAR or other 3-D scanning system can be used to create 3-D imaging of the workspace and a container within the workspace to provide environment and container-related information to better enable the gripper to correctly mate with the proper portion of the container.

Figure 5A:
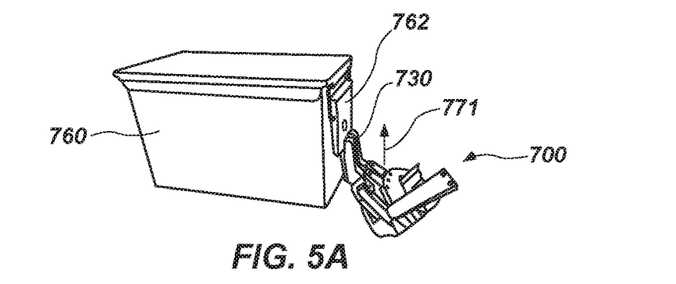
FIGS. 5A-5D are example illustrations of an end effector for a robotic arm manipulating a latch of a storage container in accordance with an embodiment of the present invention.
Figure 5B:
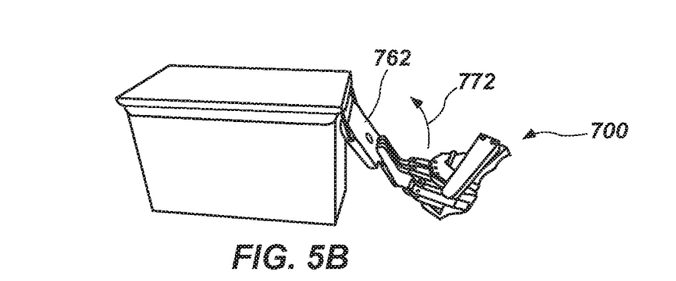
Figure 5C:
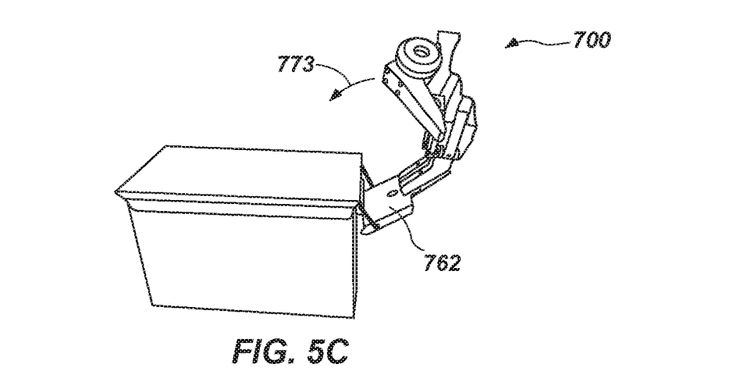
Figure 5D:
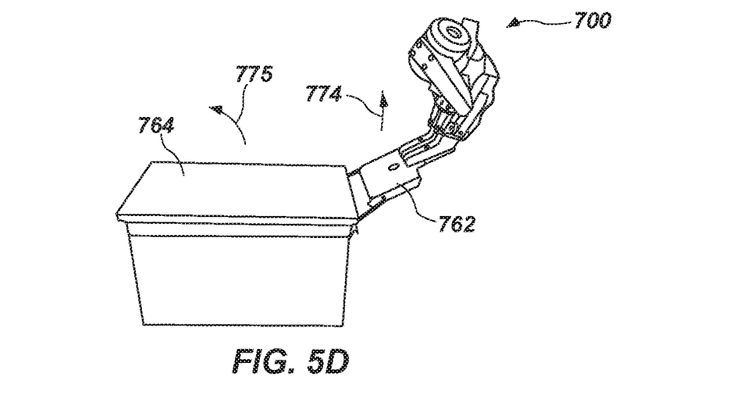

FIGS. 5A-5D illustrate an end effector 700 in use in manipulating a latch 762 of a storage container 760 to unlatch and open the storage container 760. In particular, the end effector 700 can engage the latch 762 by moving in direction 771, such that the appendage is positioned under at least a portion of the latch 762 (with the gripping member positioned over the latch 762), such that a portion of the latch 762 is caused to be at least partially received within the channel 730, as shown in FIG. 5A. Once engaged, the end effector 700 can be caused to move in direction 772 to initiate release of the latch 762, as shown in FIG. 5B, with the portion of the latch 762 being retained in the channel. The end effector 700 can continue movement in direction 773 to complete release and disengagement of the latch 762, as shown in FIG. 5C. Once the latch 762 has been disengaged, the end effector 700 can move in direction 774 and/or 775 to move a cover 764 of the container 760 to open the container 760, as shown in FIG. 5D. It should be recognized that the above-described operation for opening the container 760 can be reversed in order to close the container 760, and latch the latch 762. Thus, as illustrated herein, a single gripping member, or multiple gripping members arranged in parallel, can be used to grab the latch from one side, even if the latch is close to a flat surface, and subsequently the end effector can be operated to manipulate the latch in a manner analogous to the way that the latch would be manipulated by a human.

In addition to the storage container type illustrated in FIGS. 5A-5D, it is contemplated that an end effector in accordance with the present disclosure can be configured to open and/or close a wide variety of container types. For example, the end effector can be configured to open, close, and/or inspect a wide range of ammunition-style and gas can-style storage containers, as well as a paint container, a five gallon container, a 55 gallon drum container, or any other type of container that can be opened and/or closed utilizing an appendage and a channel formed by the appendage. In some cases, such containers have a lid with a lip around a top rim of the container that can be engaged by the appendage. Such containers can hold a wide variety of contents, such as paint, ice melting salt, pickles, chemicals, etc., which can be inspected with appropriate sensors or other equipment disposed on the end effector, as discussed herein. Modifications to the end effector, or end effectors of a somewhat different configuration which are best suited to open a given type of container are contemplated.

Figure 6A:
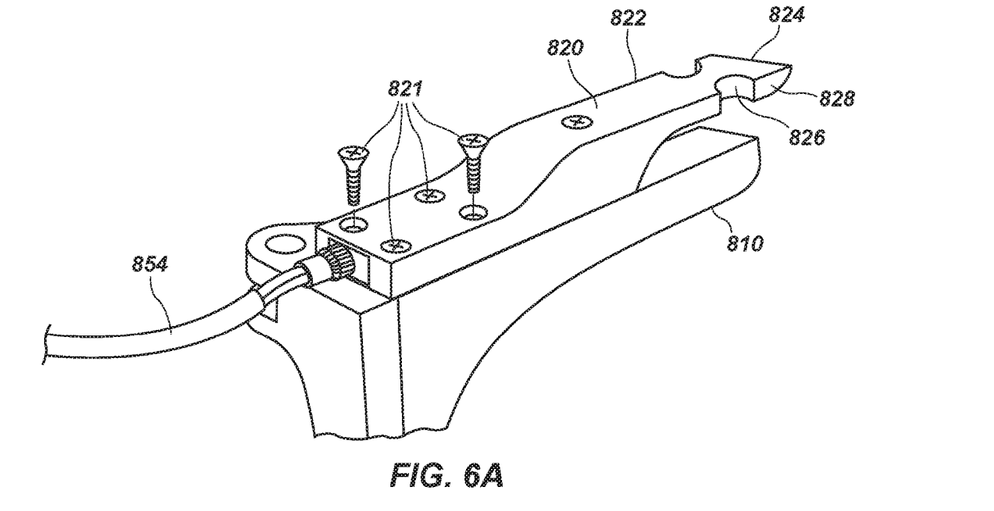
FIGS. 6A-6C are example illustrations of a retrofit appendage in accordance with an embodiment of the present invention.
Figure 6B:
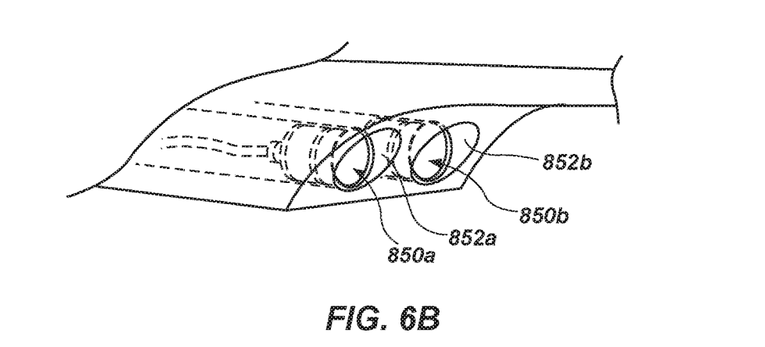
Figure 6C:
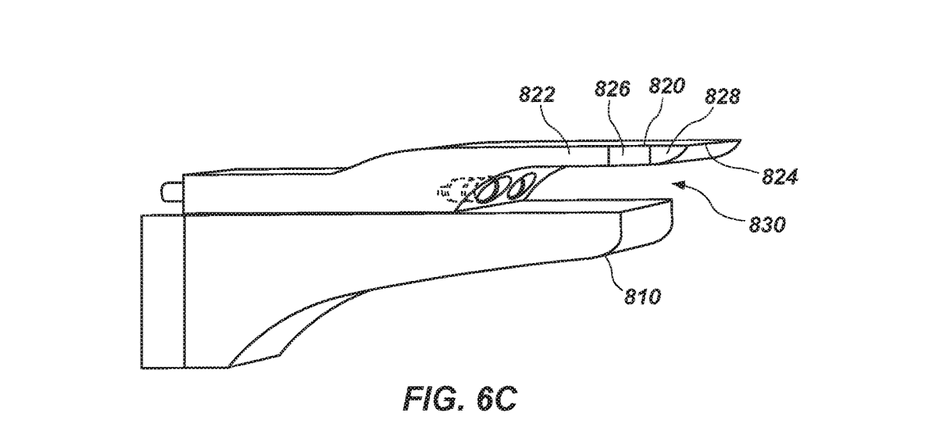

With reference to FIGS. 6A-6C, an appendage 820 is illustrated as a retrofit for an existing gripping member 810. The retrofit appendage 820 can be secured to the gripping member 810 with one or more fasteners 821 to form a channel 830. The retrofit appendage 820 can also include one or more sensors or lights 850*a*, 850*b* disposed in counter bores 852*a*, 852*b*, respectively, as described hereinabove. A cable 854 can be used to transmit power and/or data to/from the sensors or lights. Thus, an appendage can be a stand-alone device that can be added to any existing grasping apparatus/manipulator system to allow the modified grasping apparatus/manipulator system to open and/or close containers.

FIGS. 6A and 6C further illustrate, and the appendage 820 can further comprise, one or more indentations or cut-aways or cut-outs formed along the side or sides 822 of the appendage 820. The one or more cut-outs can comprise any configuration, or can be located anywhere along the appendage 820. In the exemplary embodiment shown, two cut-outs (see for example cut-out 826 and similar cut-out 827) having a semi-circular cross-section are shown formed in the appendage 820 along opposing sides 822 and 823, respectively, of the appendage 820. The cut-out 826 is shown as being positioned near the distal end 824 (unattached or free end) of the appendage 820, and is further shown as being positioned a separation distance away from the end 824, thus providing and defining a lateral edge 828 that intersects with the end 824 and the cut-out 826. Cut-out 827 is similarly positioned and configured relative to the appendage 820. The cut-outs 826 and 827 function to further assist in the opening of various containers or container types. Indeed, the cut-outs 826 and 827 can function to receive and contact a portion of a container to be opened. By providing additional surface area oriented in directions different from the sides 822, 823 and end 824 of the appendage 820, the cut-outs 826 and 827 facilitate the application of forces to and/or against objects to be manipulated (e.g., a container to be opened) that might not otherwise have been available with an appendage devoid of such cut-outs. With the presence of one or more cut-outs, the end effector is provided with additional manipulation capabilities.

As will be recognized by those skilled in the art, the cut-outs 826 and 827 formed in the appendage 820 are not intended to be limiting in any way. Indeed, those skilled in the art will recognize that the appendage can comprise any number of indentations or cut-outs, and that these can comprise any desirable or needed configuration. In addition, those skilled in the art will recognize that one or more cut-outs, similar to those shown in FIGS. 6A and 6C, can be formed in any of the exemplary appendages of any of the exemplary end effectors discussed herein. In other words, those skilled in the art will recognize that any of the exemplary end effectors, with their associated appendage(s), as discussed herein, can comprise one or more indentations or cut-outs similar to those described above and shown in FIGS. 6A and 6C.

Figure 7A:
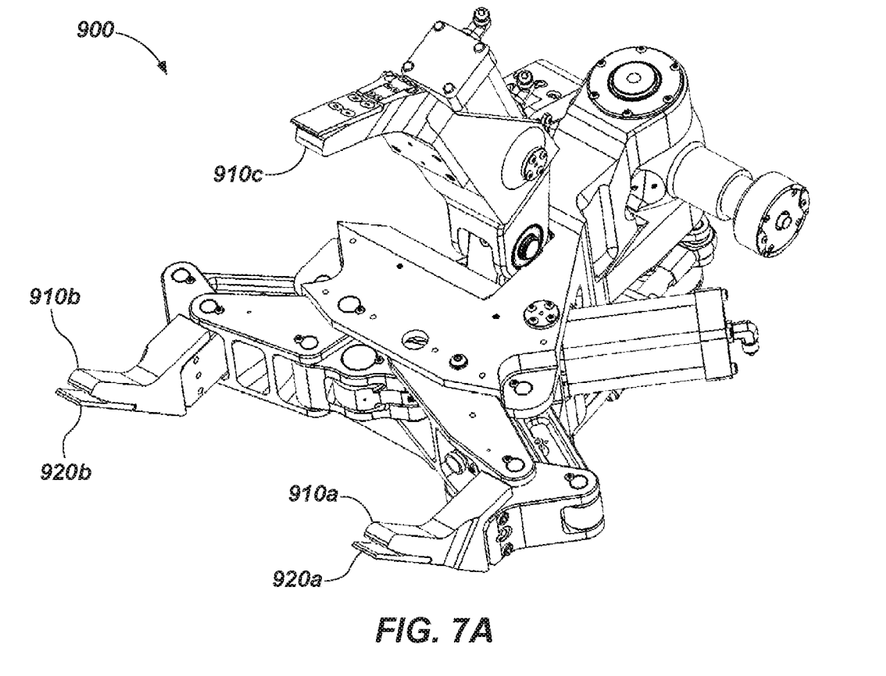
FIGS. 7A and 7B are example illustrations of a gripping member of an end effector that is rotatable to a position that minimizes interference during use of an appendage, in accordance with an embodiment of the present invention.
Figure 7B:
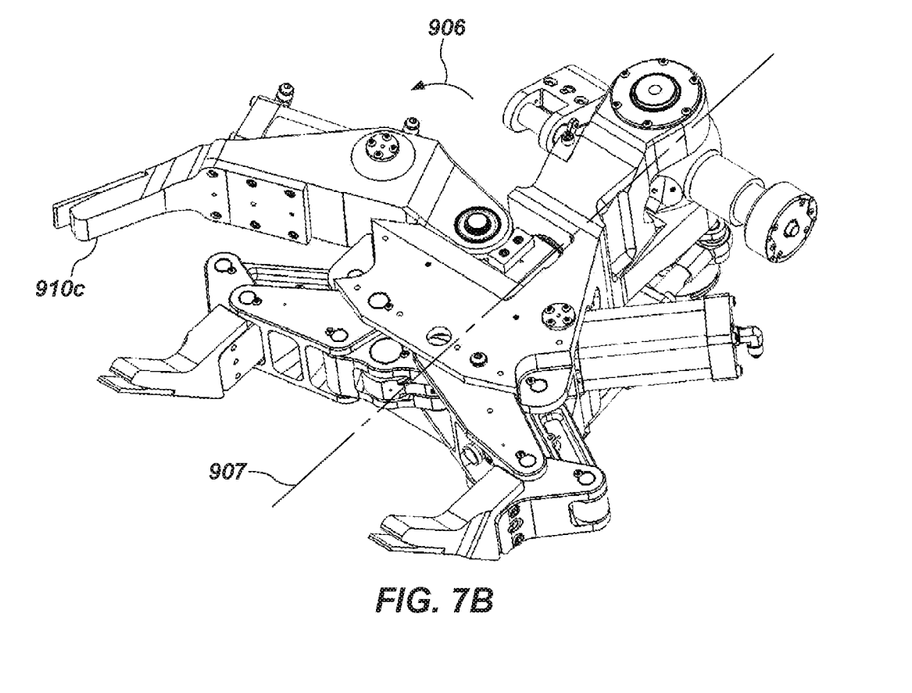

FIGS. 7A and 7B illustrate a grasping apparatus of an end effector 900 with an appendage in the form of a thumb 910c that is movable to minimize interference during use of one or more other appendages 920a, 920b. For example, the end effector 900 permits rotation of the thumb 910c in direction 906 about axis 907. Such movement can bring the thumb 910c out of the position opposite the two-jaw gripper (having appendages in the form of fingers 910a, 910b) to a position beside the two-jaw gripper. This can provide space for the appendages 920a, 920b to be used alone and without mechanical interference with the thumb 910c when manipulating an article, such as opening a container. When operations utilizing the appendages are complete, the thumb 910c can be rotated back into position opposite the two-jaw gripper for full grasping functionality of the end effector with the fingers 910a, 910b and the thumb 910c.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. An end effector for a robotic arm, comprising:
   a grasping apparatus having a gripping member and a first wall; and
   an appendage extending from the gripping member and having a second wall opposing the first wall, the first and second walls forming an elongated channel between the griping member and the appendage, wherein the appendage extends beyond a midpoint between a closed end of the elongated channel and an end of the gripping member, and wherein the elongated channel captures an article between the first and second walls, wherein the article is gripped solely by the end effector.

2. The end effector of claim 1, further comprising at least one of a sensor and a light source.

3. The end effector of claim 2, wherein the at least one of a sensor and a light source is associated with the appendage to assist positioning of the elongated channel when receiving the article to be manipulated.

4. The end effector of claim 1, wherein the first and second walls are angled to form a tapered elongated channel.

5. The end effector of claim 1, wherein the first and second walls are parallel to each other.

6. The end effector of claim 1, wherein the appendage is removably attachable to the gripping member.

7. The end effector of claim 1, wherein the elongated channel is configured to receive a storage container latch.

8. The end effector of claim 1, wherein the grasping apparatus comprises at least one of a sensor and a light source.

9. The end effector of claim 1, wherein the grasping apparatus comprises a second gripping member that is rotatable to a position that minimizes interference during use of the appendage.

10. The end effector of claim 1, wherein the grasping apparatus comprises a second gripping member having a second appendage.

11. The end effector of claim 1, wherein the appendage further comprises one or more cut-outs formed in one or more sides of the appendage.

12. The end effector of claim 1, wherein the appendage is positioned about a surface opposite a grasping surface of the gripping member.

13. The end effector of claim 1, wherein the appendage extends a distance beyond an end of the gripping member.

14. The end effector of claim 1, wherein the channel further comprises a friction enhancing feature.

* * * * *